United States Patent [19]
Kogelnik et al.

[11] 4,261,639
[45] Apr. 14, 1981

[54] OPTICAL PULSE EQUALIZATION IN SINGLE-MODE FIBERS

[75] Inventors: Herwig W. Kogelnik, Rumson; Chinlon Lin, Middletown, both of N.J.

[73] Assignee: Bell Telephone Laboratories, Incorporated, Murray Hill, N.J.

[21] Appl. No.: 94,041

[22] Filed: Nov. 13, 1979

[51] Int. Cl.³ .................................................. G02B 5/14
[52] U.S. Cl. ................................. 350/96.15; 350/96.30
[58] Field of Search ............................ 350/96.15, 96.30

[56] References Cited
PUBLICATIONS

L. G. Cohen et al., "Pulse Delay Measurements in the Zero Material Dispersion Wavelength Region for Optical Fiber", *Appl. Opt.* vol. 16, No. 12, Dec. 1977.
L. G. Cohen et al., "Tailoring Zero Chromatic Dispersion into the 1.5–1.6μm Low-Loss Spectral Region of Single-Mode Fibers", *Electronic Letts.*, vol. 15, No. 12, Jun. 1979.
S. Machida et al., "1.5 μm Optical Transmission Experiments Using Very Low-Loss Single-Mode Fibers", *Electronics Letts.* vol. 15, No. 8, Apr. 1979.

Primary Examiner—Stewart J. Levy
Attorney, Agent, or Firm—Michael B. Einschlag

[57] ABSTRACT

An optical pulse equalization technique for minimizing pulse dispersion in a single-mode fiber transmission system where there is a mismatch between the optical source (1) wavelength and the wavelength at which a transmission single-mode fiber (2) has a zero total dispersion utilizes the positive and negative dispersion characteristics of single-mode fibers on both sides of the zero total dispersion wavelength. A second equalizer single-mode fiber (3) is used as an optical equalizer. This equalizer single-mode fiber has the property that the optical source wavelength lies at a value which is between the zero dispersion wavelengths of the transmission and equalizer single-mode fibers. The transmission fiber and the equalizer fiber have different dispersion signs at the source wavelength and the length of the equalizer fiber is chosen to be equal to the length of transmission fiber times the ratio of the dispersions for the fibers at the source wavelength.

3 Claims, 3 Drawing Figures

OPTICAL PULSE EQUALIZATION IN SINGLE-MODE FIBERS

The present invention pertains to the field of optical transmission through fibers and more specifically to optical transmission through single-mode fibers.

In multi-mode fibers the transmission bandwidth is limited by modal dispersion. In single-mode fibers there is no modal dispersion and ultimately the transmission capacity is limited by material dispersion and waveguide dispersion (see for example, L. G. Cohen and Chinlon Lin, "Pulse Delay Measurements in the Zero Material Dispersion Wavelength Region for Optical Fibers", *Applied Optics*, Vol. 16, No. 12, December 1977). The total dispersion in single-mode fibers thus includes both the material and the waveguide effects. With conventional design single-mode fibers usually have small waveguide dispersion and material dispersion dominates; the resultant total dispersion is zero to first order in the wavelength region near 1.3 μm.

Recently there has been considerable interest in single-mode fibers having zero total dispersion in the 1.5–1.7 μm spectral region because both experimental results and theoretical calculations indicate that very low losses (0.2–0.5 dB/Km) can be achieved in the 1.5–1.7 μm region. High bandwidth long distance optical transmission will require both ultralow loss and ultralow dispersion in the same wavelength region. As mentioned above in single-mode fibers of conventional design the 1.3 μm region is the region of zero dispersion but the loss window in the 1.5–1.7 μm region is wider than that near 1.3 μm, and the losses are much lower. This is because at present in practical single-mode fibers the OH absorption near 1.39 μm causes the 1.3 μm loss minimum to be above 0.5 dB/Km. Therefore, it is advantageous to tailor-design single-mode fibers with total dispersion minimum into these lower loss regions for high bandwidth and long distance optical transmission systems.

Single-mode fibers with total dispersion equal to zero at a wavelength $\lambda_o$ in the 1.5–1.6 μm region can be made by by using higher $GeO_2$ doping and by controlling the waveguide dispersion in single-mode fibers, for example see an article entitled "Tailoring Zero Chromatic Dispersion into the 1.5–1.6 μm Low-Loss Spectral Region of Single-Mode Fibers", *Electronics Letters*, Vol. 15, No. 12, June 7, 1979, pp. 334–335 by L. G. Cohen,, Chinlon Lin, and W. G. French. Total dispersion in single-mode fibers can be designed to have its minimum dispersion wavelength $\lambda_o$ anywhere in the 1.3–1.7 μm region by proper control of dopant, doping concentration, core diameter, and refractive-index profile. Unfortunately, $\lambda_o$ depends rather sensitively on both the core diameter and the refractive index profile. Ideally, one would like to make single-mode fibers with $\lambda_o$ in the low loss window and use a laser source, such as single-mode InGaAsP laser diode, with its wavelength $\lambda_s$ matching $\lambda_o$. It is not too difficult to control fiber manufacturing so that $\lambda_o$ falls within the rather wide low loss window, but exact matching between $\lambda_s$ and $\lambda_o$ requires more technological effort. Even if the semiconductor laser oscillates in just a few modes the transmission could be dispersion limited if a very large bandwidth is to be used with the very long distances utilizable at very low fiber losses.

SUMMARY OF THE INVENTION

An optical pulse equalization technique for minimizing pulse dispersion in a single-mode fiber transmission system where there is a mismatch between the optical source wavelength and the wavelength at which a single-mode transmission fiber has a zero total dispersion utilizes the positive and negative dispersion characteristics of single-mode fibers on both sides of the zero total dispersion wavelength. A second single-mode fiber is used as an optical equalizer. This second equalizer single-mode fiber is designed to have the property that the optical source wavelength lies at a value which is between the zero dispersion wavelength of the transmission single-mode fiber and the equalizer single-mode fiber. If the optical source wavelength is greater than the zero dispersion wavelength of the transmission fiber then the zero dispersion wavelength of the equalizer fiber must be larger than the optical source wavelength. If the optical source wavelength is smaller than the zero dispersion wavelength of the transmission fiber then the zero dispersion wavelength of the equalizer fiber must be smaller than the optical source wavelength. The transmission fiber and the equalizer fiber are chosen to have different dispersion signs at the optical source wavelength. The length of the equalizer fiber is chosen to be equal to the length of transmission fiber times the ratio of the dispersions for the transmission fiber and the equalizer fiber, the ratio being calculated at the optical source wavelength.

BRIEF DESCRIPTION OF THE DRAWING

A complete understanding of the present invention may be gained from a consideration of the detailed description presented hereinbelow in connection with the accompanying drawings in which.

DETAILED DESCRIPTION

Chromatic dispersion $M(\lambda)$ of a fiber is defined as $$M(\lambda) = \frac{1}{L} \frac{d\tau}{d\lambda} \quad (1)$$

where $\tau$ is the time delay for a light pulse propagating in a single-mode fiber of length L. The time delay $\tau$ is related to the propagation constant $\beta$ of the fiber by $$\tau = -L \frac{\lambda_s^2}{2\pi c} \left( \frac{d\beta}{d\lambda} \right)_{\lambda_s} \quad (2)$$

where $\lambda_s$ is the central wavelength of the light source, and c is the speed of light. (See Cohen and Lin discussed hereinabove). The amount of pulse broadening due to an optical source with spectral width $\Delta\lambda_s$ is then given $$\Delta \tau = \left| \Delta \lambda_s \left( \frac{d\tau}{d\lambda} \right)_{\lambda_s} \right| = \left| M(\lambda_s) \cdot \Delta \lambda_s \cdot L \right|. \quad (3)$$

For a cascaded single-mode fiber chain consisting of n fibers the total pulse broadening is given by:

$$\Delta \tau = \left| \left( \sum_{i=1}^{n} M_i(\lambda_s) L_i \right) \Delta \lambda_s \right| \quad (4)$$

where $M_i$ is the chromatic dispersion, and $L_i$ the fiber length, of the $i^{th}$ fiber.

We describe herein an optical pulse equalization apparatus for minimizing chromatic dispersion in single-mode fiber transmission systems having a mismatch between an optical source wavelength and the zero total dispersion wavelength of a transmission single-mode fiber. According to the present invention use of a second single-mode fiber as an equalizer can reduce pulse broadening in the single-mode transmission fiber when the source wavelength is between the zero dispersion wavelengths of the two fibers, i.e., transmission fiber and equalizer fiber.

Assume first that a laser source designed to have its wavelength ($\lambda_s$) matching the zero total dispersion wavelength ($\lambda_o$) of a given single-mode fiber turns out in its production to have a $\lambda_s$ different from $\lambda_o$, and that $\lambda_s > \lambda_o$.

Figure 1:
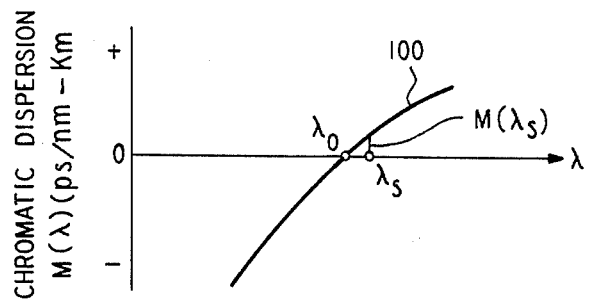
FIG. 1 shows, in graphical form, the chromatic dispersion of a single-mode transmission fiber.

Curve 100 in FIG. 1 represents the chromatic dispersion of the transmission fiber. The difference between $\lambda_s$ and $\lambda_o$ may be so small that the chromatic dispersion $M(\lambda_s)$ is small enough to be suitable for some systems. However, with low loss fibers and long distances the system may become dispersion limited and not loss limited. Thus, even though the pulse broadening due to dispersion may be small for 1 Km, the accumulated pulse broadening, $M(\lambda_s) \times L \times \Delta\lambda_s$, could become large for long distances such as 100 Km, even where the chromatic dispersion $M(\lambda_s)$ itself is small. Here $\Delta\lambda_s$ is the laser source spectral width and L is the length of the fiber.

Figure 2:
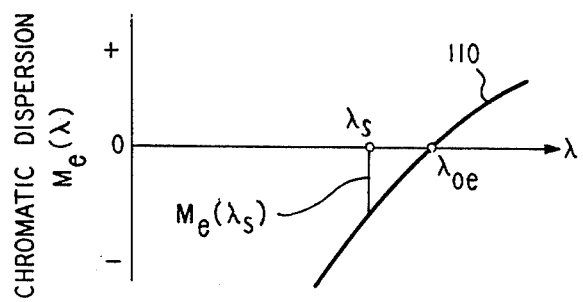
FIG. 2 shows, in graphical form, the chromatic dispersion of a single-mode equalization fiber.

The optical pulse equalizer consists of a single-mode fiber having a zero-dispersion wavelength $\lambda_{oe}$ such that $\lambda_s$ is in between $\lambda_o$ and $\lambda_{oe}$. Curve 110 in FIG. 2 represents the chromatic dispersion of the equalizer fiber. Note that since we have assumed $\lambda_s > \lambda_o$ we need to have $\lambda_s < \lambda_{oe}$ as is shown in FIG. 2.

Note that the chromatic dispersion of the transmission fiber and the equalizer fiber have an opposite sign at the source wavelength, $\lambda_s$. This can be seen in FIG. 1 and FIG. 2. Thus, within the initial optical pulse the longer wavelength spectral components, e.g., at $\lambda_s + \Delta\lambda_s/2$, have a slower group velocity than the shorter wavelength spectral components, e.g. at $\lambda_s - \Delta\lambda_s/2$ because, $\lambda_s$ is on the longer wavelength side of $\lambda_o$. In the equalizer fiber the opposite is true and the original pulsewidth is restored if the following condition is met:

$$M(\lambda_s)L\Delta\lambda_s + M_e(\lambda_s)L_e\Delta\lambda_s = 0 \quad (5)$$

where $M_e(\lambda_s)$ is the chromatic dispersion of the equalizer fiber at the source wavelength and $L_e$ is the length of the equalizer fiber.

Figure 3:
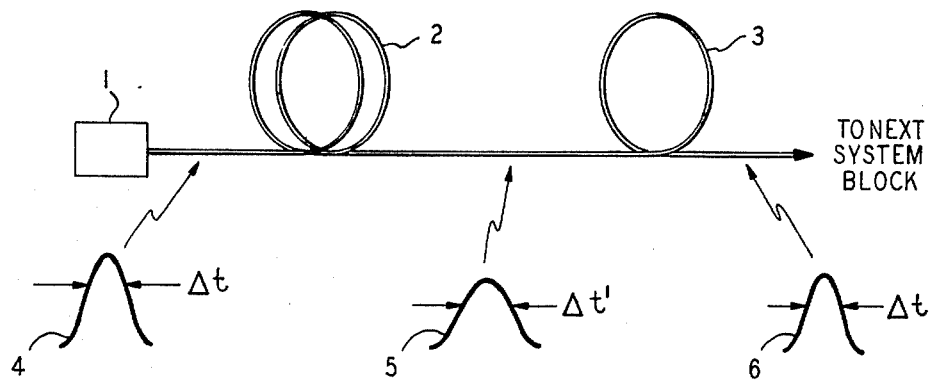
FIG. 3 shows, in diagrammatic form, a section of an optical transmission system utilizing an embodiment of the present invention.

FIG. 3 shows a pulse equalizing system. Block 1 represents an optical source and curve 4 shows the pulse produced by the source. Fiber 2 is the transmission fiber and curve 5 represents the broadened optical pulse after transmission therethrough. Finally, fiber 3 is the equalizer fiber and curve 6 represents the optical pulse which has been restored to its original shape after transmission therethrough.

Solving Eq. (5) for $L_e$ gives $$L_e/L = -M(\lambda_s)/M_e(\lambda_s). \quad (6)$$

Note that the ratio in Eq. 2 is positive since $M(\lambda_s)$ and $M_e(\lambda_s)$ have opposite signs. In the above-described fiber transmission system, although the chromatic dispersion $M(_{80\ s})$ is small because the mismatch between $\lambda_s$ and $\lambda_o$ is small, the large length L of transmission fiber 2 may cause significant accumulated pulse broadening. The equalizer fiber may be chosen to have a large opposite-signed $M_e(\lambda_s)$ in order that $L_e$ can be quite short. A short $L_e$ equalizer fiber would not introduce much insertion loss while restoring the pulse width of the optical signal.

Note also that according to the present invention if $\lambda_s < \lambda_o$ then we need to design an equalizer fiber having $\lambda_{oe} < \lambda_s$.

An example illustrating the present invention in a long distance optical fiber transmission system is considered hereinbelow. Assume we have a laser source at $\lambda_s = 1550$ nm (which is right near the loss minimum for single-mode fibers) and having a spectral width $\Delta\lambda_s = 5$ nm, e.g., see an article entitled "1.5 $\mu$m Optical Transmission Experiments Using Very Low-Loss Single-Mode Fibers", *Electronics Letters*, Vol. 15, No. 8, Apr. 12, 1979, pp. 219–221, by S. Machida et al, and a single-mode transmission fiber having a minimum dispersion wavelength $\lambda_o = 1560$ $\mu$m. The lowest loss at $\lambda_s$ for such a fiber can be as low as 0.3 dB/Km corresponding to $\sim 9$ mole percent $GeO_2$ doping and $\Delta n = 1$ percent (see the Cohen et al reference cited hereinabove). Such a loss makes a tranmission length of over 100 Km reasonable. However, $M(\lambda_s)$, the total dispersion for such a single-mode transmission fiber would be $\sim 0.8$ ps/nm-Km. Thus, for a 100 Km length fiber $M(\lambda_s)\Delta\lambda_s L \sim 400$ ps gives a pulse broadening which limits the transmission bandwidth to about 600 MHz. To increase the bandwidth we can choose as an equalizer a single-mode fiber having $\lambda_{oe} \sim 1350$ nm. A typical such fiber would have $M_e(\lambda_s) \sim 16$ ps/nm-Km and $M_e(\lambda_s) \simeq -20\ M(\lambda_s)$. Using equation (6) and solving for $L_e$ provides that a length $L_e = 5$ Km will provide equalization. Since it is well known in the art how to produce a fiber with $\lambda_{oe} \sim 1350$ nm having a loss $\sim 0.2$ dB/Km at $\lambda_s$, the use of the equalizer fiber plus the splice will provide for low loss transmission.

It shold be clear to those skilled in the art that this technique can be implemented in practice by adjusting the equalizer fiber length for minimum overall pulse broadening in the entire transmission system. This reduction or elimination, to first order, of the dispersion limited pulse broadening will increase the transmission bandwidth to tens of GHz even for 100 Km distances.

Also, it should be clear from the description of the invention hereinabove that the dispersion minimization and equalizations can be achieved by using more than two fibers in the fiber chain as long as the overall broadening is minimized by minimizing $$\sum_{i=1}^{n} M_i(\lambda_s) L_i$$

in Eq. (4), for example by choosing the length, $L_e$, of one of the n fibers in an optical transmission system to be equal to $$-\sum_{i=1}^{(n-1)} M_i(\lambda_s) L_i / M_e$$

where $M_e$ is the chromatic dispersion of the fiber having the length $L_e$.

We claim:

1. An optical pulse equalizer for equalizing a pulse of radiation at a source wavelength $\lambda_s$ which propagates through a single-mode optical fiber (2) having a first zero-dispersion wavelength, a fiber length L and a first chromatic dispersion M at said source wavelength which comprises:
   a second single-mode fiber (3) having a second zero-dispersion wavelength such that said source wavelength has a value between said first zero-dispersion wavelength and said second zero-dispersion wavelength and further having a second chromatic dispersion $M_e$ at said source wavelength which has the opposite dispersion sign from said first chromatic dispersion, said second single-mode fiber having a length $L_e$ in accordance with the following equation: $L_e = -M \cdot L / M_e$.

2. An optical fiber transmission system comprising: an optical source (1) having a wavelength $\lambda_s$; at least two lengths of single mode optical fibers (2, 3) connected in tandem, one (2) of said two fibers having a length L and a chromatic dispersion M at wavelength $\lambda_s$; characterized in that a second one (3) of said at least two fibers has a length $L_e = -M \cdot L / M_e$ where $M_e$ is the chromatic dispersion at wavelength $\lambda_s$ of the second one of said at least two fibers.

3. An optical fiber transmission system comprising: an optical source (1) having a wavelength $\lambda_s$ and a plurality of n−1 single-mode optical transmission fibers, where n is an integer greater than one and the $i^{th}$ one of said plurality has a fiber length $L_i$ and a chromatic dispersion $M_i$ at said source wavelength; characterized in that the optical fiber transmission system further includes an $n^{th}$ single-mode fiber (3) having a chromatic dispersion $M_e$ at said source wavelength which has the opposite sign from the sum of the products $M_i L_i$ for the n−1 single-mode optical transmission fibers, said further single-mode fiber having a length $L_e$ in accordance with the following equation:

$$L_e = -\left(\sum_{i=1}^{(n-1)} M_i L_i\right) / M_e.$$

* * * * *